United States Patent [19]

Hampton

[11] Patent Number: 4,741,032
[45] Date of Patent: Apr. 26, 1988

[54] CONTAINER FOR TELEPHONE NETWORK INTERFACE DEVICE

[75] Inventor: Clifton G. Hampton, Bedford, Tex.

[73] Assignee: Siecor Corporation, Hickory, N.C.

[21] Appl. No.: 840,027

[22] Filed: Mar. 17, 1986

[51] Int. Cl.[4] .............................................. H04M 9/00
[52] U.S. Cl. .................................... 379/399; 220/337; 361/356; 361/426
[58] Field of Search ...................... 379/27, 29, 30, 102, 379/188, 199, 372, 377, 387, 397, 399, 412, 428, 429, 433, 441, 442; 361/19, 380, 426, 428, 413, 415, 390, 395, 392, 417, 426, 356, 399; 339/122 R, 123, 147 R, 176 M, 198 R, 14 R; D13/13, 30; D14/52, 60; 220/254, 255, 340, 341, 337, 3.8; 439/95, 377; 179/81 R

[56] References Cited

U.S. PATENT DOCUMENTS

| | | | |
|---|---|---|---|
| D. 287,583 | 1/1987 | Smith et al. | D14/52 |
| 3,333,726 | 8/1967 | Belanger | 220/337 |
| 3,610,460 | 10/1971 | Siklos et al. | 220/337 X |
| 4,488,008 | 12/1984 | Dellinger et al. | 379/30 |
| 4,560,839 | 12/1985 | Dillard | 379/399 |
| 4,562,311 | 12/1985 | Dola | 379/412 X |
| 4,624,514 | 11/1986 | Smith | 379/412 |
| 4,647,725 | 3/1987 | Dellinger et al. | 379/399 X |

OTHER PUBLICATIONS

SNI 2100 Network Interface Device sold by Keptel described in FIGS. 1-11 of attached drawings.

Primary Examiner—Jin F. Ng
Assistant Examiner—R. Vaas
Attorney, Agent, or Firm—Roy B. Moffitt

[57] ABSTRACT

A telephone network interface device adapted to be connected to and in between a telephone subscriber premise wiring and a Telephone Company owned subscriber loop comprising a backwall and a sidewall affixed to the sidewall delimiting a cavity in which there is: first and second sets of terminals connected to the backwall and a device to place the terminals of the first set in removably electrical communication with the second set of terminals, the first set of terminals comprising first and second spaced-apart dielectric blocks, each dielectric block containing a plurality of terminals and a plurality of first slots in a first surface and a second slot in a second surface, each of the first slots in the first dielectric block being in alignment with one of the first slots in the second dielectric block and disposed essentially perpendicular to the base and the second slots are mechanically and slideably fitted over a rib on the base so that the dielectric blocks may be slideably moved towards and away from one another. Affixed to the sidewall are outer and inner overlapping removable doors, both hingeably engaged to the sidewall and adapted to be rotated between a closed and open position. A hinge rotatively engages the outer and inner doors to the sidewall, prohibiting disengagement of either door when the inner door is in the closed position and permitting disengagement of the outer door when the inner door has been placed in a predetermined position.

20 Claims, 10 Drawing Sheets

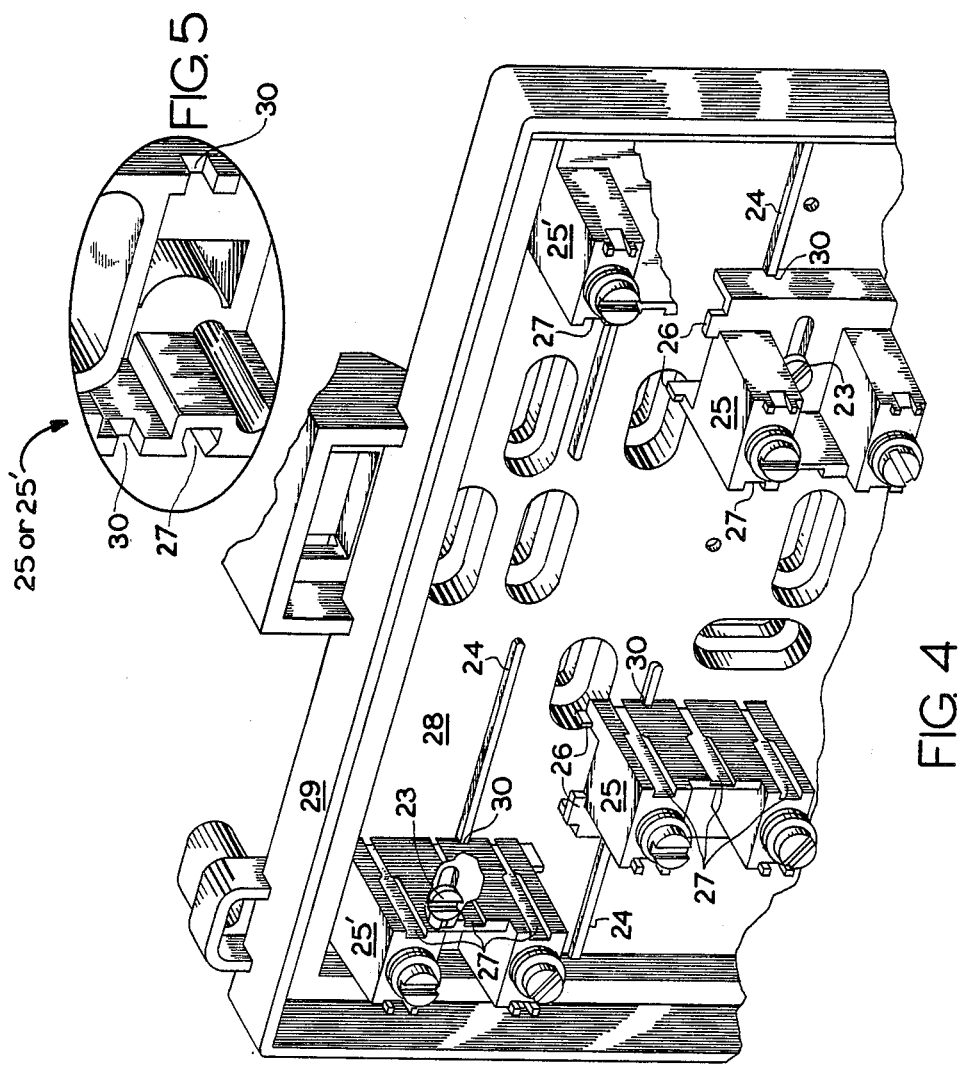

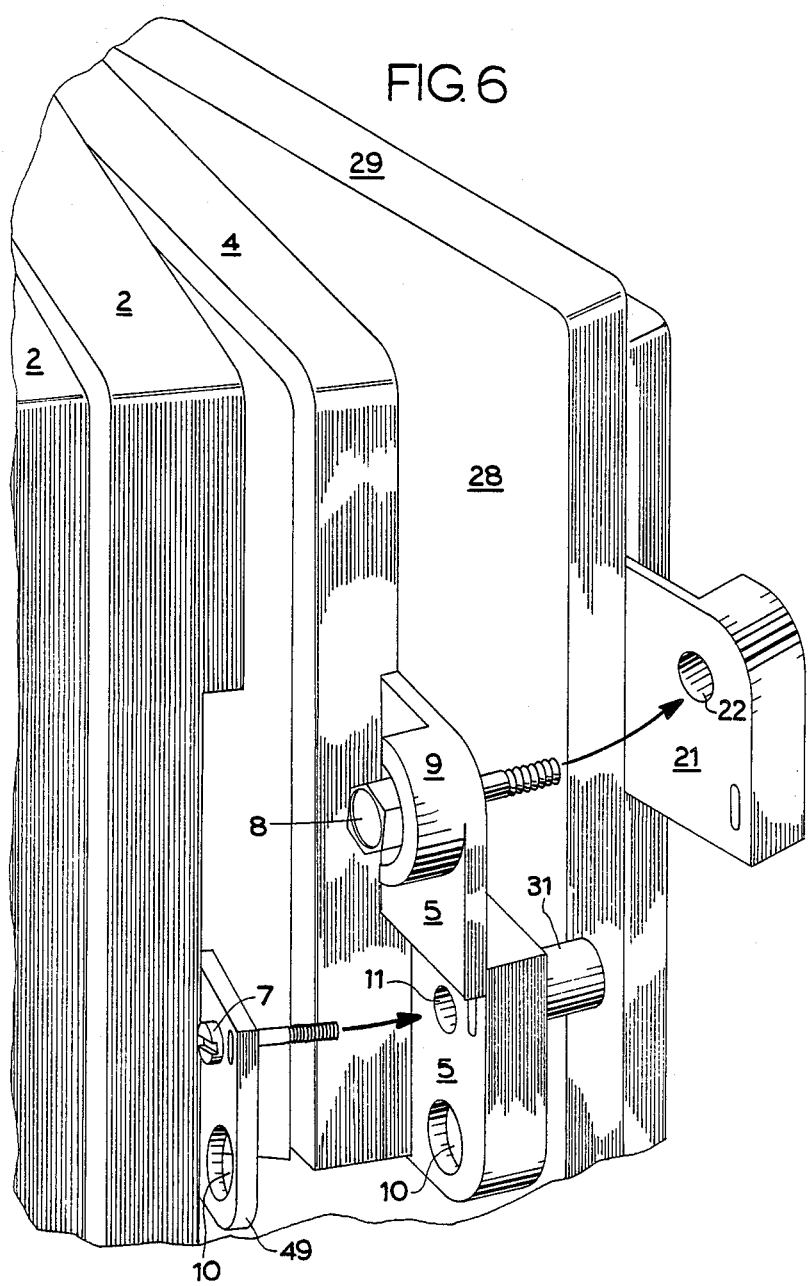

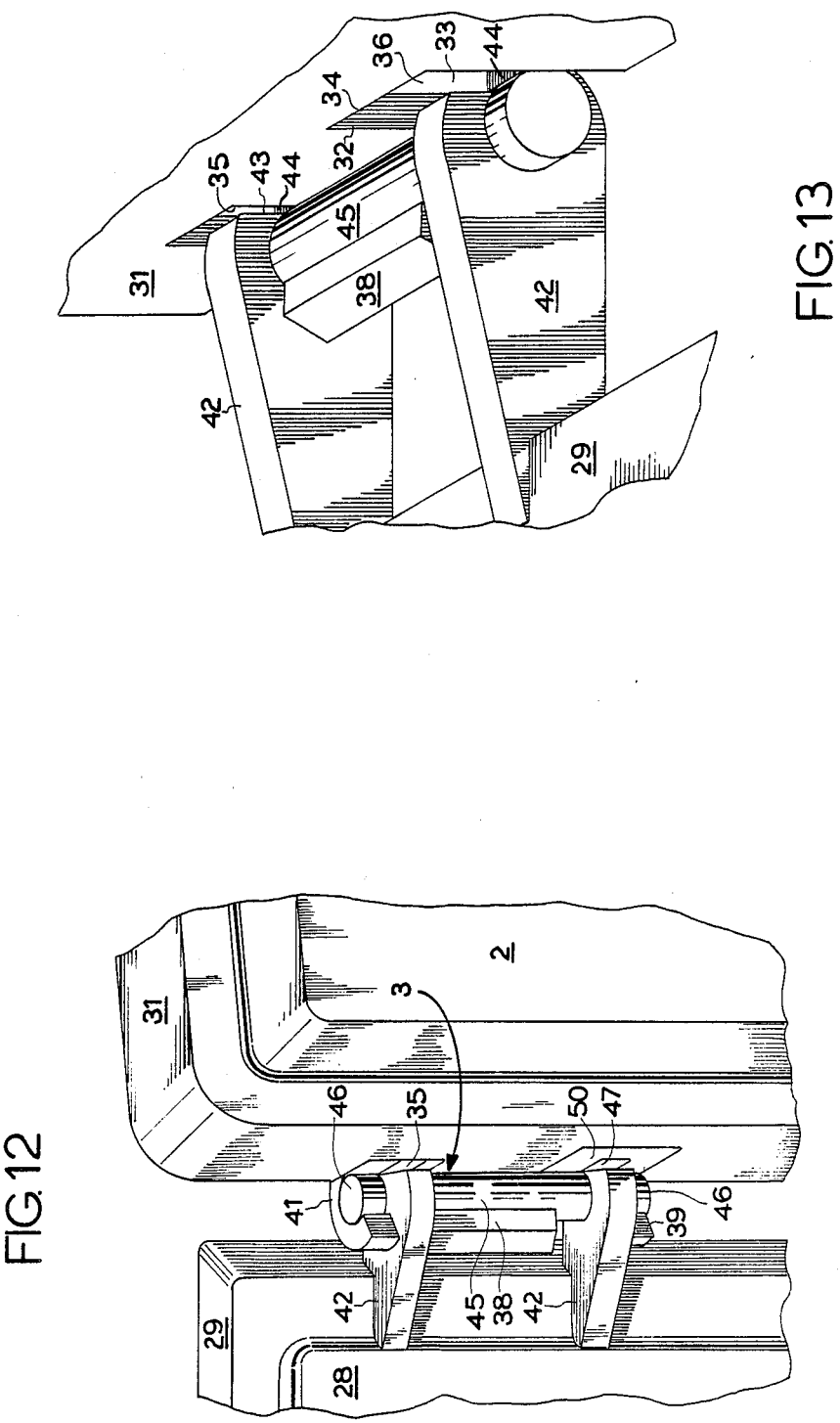

CONTAINER FOR TELEPHONE NETWORK INTERFACE DEVICE

BACKGROUND OF THE INVENTION

The background of the enclosed invention is the same as that which is described in U.S. Pat. No. 4,488,008 in column 1, lines 1 through 63 and in U.S. patent application Ser. No. 06/710,451 entitled "Indoor Type Telephone Network Interface Device", the aforementioned patent and patent application being assigned to a common assignee, and having a common co-inventor.

Briefly stated, the invention is a telephone network interface device designed and adapted to be connected to the non-Telephone Company owned premises wiring and the Telephone Company owned portion of the subscriber loop at the juncture where the two connect one to another and may be mounted inside or outside of the owner's premises. The device provides a quick disconnect means therebetween, namely a plug and jack. The plug is mechanically and electrically engaged in the jack, thus forming an electrical circuit between the subscriber owned premises wiring and the Telephone Company owned portion of the subscriber loop. Removal of the plug from the jack disconnects the two and provides a jack into which a plug, connected to an operating telephone, may be inserted. If there is no fault in the Telephone Company owned subscriber loop portion, dial tone will be heard and the call may be made, thus indicating that any fault must be in the subscriber owned premise wiring and/or equipment. Absence of dial tone and the completed call, indicates the reverse, i.e., there is a fault in the Telephone Company owned portion of the subscriber loop.

In U.S. Pat. No. 4,488,008 entitled "Telephone Network Interface Device", there is taught a telephone network interface device, somewhat similar to and faces a problem common to that which is disclosed herein: namely, a shield member is used to cover and thus secure a portion of the cavity delimited by a backwall and a sidewall. Affixed to the backwall is a door that in its superimposed position covers the shield member and the balance of the cavity not covered by the shield. The primary purpose of the shield is to keep unauthorized personnel (non-Telephone Company employees) from entering that portion of the cavity covered by the shield (secured cavity) because in that part of the cavity are not only electronic components (half ringers and the like), but also the terminals that connect directly to the Telephone Company owned portion of the subscriber loop. Thus, the so-called secured cavity of the telephone network interface device gives rise to two problems, one of these problems having been faced by the known prior art and only partially solved and the other not faced by the known prior art.

The first problem is the one of access to the secured cavity by Telephone Company employees and prohibited access to such cavity by the premise owner. A special screw used with the shield is usually used by Telephone Companies to secure the shield to the backwall thereby making it difficult, but not impossible, for premises owners to remove the shield and thus delight themselves with the contents of the secured portion of the cavity. This secured portion not only contains the terminals that connect directly to the Telephone Company subscriber loop, but also other electronic components such as half ringers and the like; thus, intended or unintended mischief and damage can be caused to rather expensive components by untrained lay personnel giving rise to the problem to identify irrefutable evidence that an unauthorized person has made entry into the secured cavity. This problem has remained unsolved and unrecognized by the prior art. Another problem that has remained unsolved is a mechanism or device within the secured cavity that would permit the accommodation of a plurality of printed circuit boards containing electronic circuits (half-ringers and the like) of different and varying sizes.

With respect to the first-mentioned problem such is solved by a unique double door combination. Some of the prior art teaches a double door combination, but does not solve the problem of creating irrefutable evidence that there has been an unauthorized entry into a secured cavity. It is towards solution to this problem, as well as the problem of accommodating printed circuit boards of various sizes in the secured cavity, that the instant invention is directed.

BRIEF SUMMARY OF THE INVENTION

The disclosed telephone network interface device is an improvement over known like prior art telephone network interface devices, the improvement being embodied in a design of the box in which the telephone network interface device is contained. The box itself comprising a base composed of a backwall and upstanding sidewall affixed to the backwall, delimiting a cavity. Affixed to the sidewall is an outer removable door rotatively engaged and adapted to be rotated between a closed and open position. Also rotatively engaged to the sidewall is an inner removable door adapted to be rotated between a closed and open position. The inner door is designed so that it covers a certain predetermined portion of the cavity, namely that secured portion of the cavity containing the first set of terminals adapted to be connected to the Telephone Company owned portion of the subscriber loop and one or more printed circuit boards containing electronic circuits, such as a ringer or half ringer. The outer door is of such a size that it covers all of the cavity and all of the inner door and in its open position, exposes the inner door (when the inner door is in its closed position) and at least part of the cavity. When the inner door is in its open position, (usually nested in the outer door), it exposes a second set of terminals, in the second cavity, namely that set of terminals adapted to be connected to the Telephone Company owned wiring. A jack and plug are disposed in the non-secured portion of the cavity, the plug being adapted to be engaged in a jack to connect the first set of terminals with the second set of terminals and allow, upon disconnection of the plug with the jack, the insertion into the jack a plug that is otherwise connected to an operating telephone handset so that the testing procedure for a fault either in the subscriber loop or on the premise wiring may be carried out as taught by the prior art.

A novel hinge is used to rotatively engage the inner and outer doors to the sidewall. It permits disengagement of the inner door from the sidewall when both doors have been placed in a predetermined position, e.g., an open position. Such an arrangement requires that the inner door must be removed before the outer door can be removed. Therefore, when a subscriber says that either one or both of the doors are removed, this gives the Telephone Company irrefutable proof that the inner door has been removed and that there has been unauthorized access to the secured portion of the cavity.

In the secured portion of the cavity (that portion of the cavity covered by the inner door) are the first set of terminals, composed of first and second spaced apart dielectric blocks, each dielectric block containing a plurality of metallic terminals and a plurality of first slots in a first surface of the dielectric blocks. Each of the first slots in the first dielectric block are in alignment with one of the first slots in the second dielectric block and disposed essentially perpendicular to the backwall. These first and second spaced apart dielectric blocks are removably secured to the base and contain second slots in a second surface on the dielectric blocks. The second slots and the second surface are disposed essentially perpendicular to the first slots and parallel to and in contact with the backwall. Affixed to the backwall and protruding into the secured cavity are upstanding rib members slideably engaged in one of the second slots of the dielectric block so that the second dielectric blocks may be slideably moved towards and away from one another along the ribs while in engagement with the ribs. Each one of the dielectric blocks in the secured cavity are capable of being severed in to at least two separate blocks thus providing a series of dielectric blocks that are slideable along the backwall of the box in the above described manner to accommodate various and sundry printed circuit boards (PC boards) of different lengths.

BRIEF DESCRIPTION OF THE DRAWINGS

FIG. 4 is a perspective, partial cut-away view of the backwall 28 and sidewall 29 of FIG. 3, illustrating various positions that the dielectric blocks 25 and 25' of FIG. 3 can take to accommodate various sizes of printed circuit boards.

FIG. 5 is a perspective exploded view of a portion of terminal dielectric block 25 and 25' of FIG. 4.

FIG. 6 is a partial cut-away perspective view of a locking mechanism for the outer and inner doors of the invention.

FIG. 12 is a partial perspective view of the hinge of FIG. 9 with both outer and inner doors rotated almost 180° from their closed to their open position, creating a combination that permits removal of the inner door from engagement.

FIG. 13 is a partial cut-a-way perspective view of the hinge of FIG. 12 with the inner door disengaged.

DETAILED DESCRIPTION OF THE INVENTION

Figure 1:
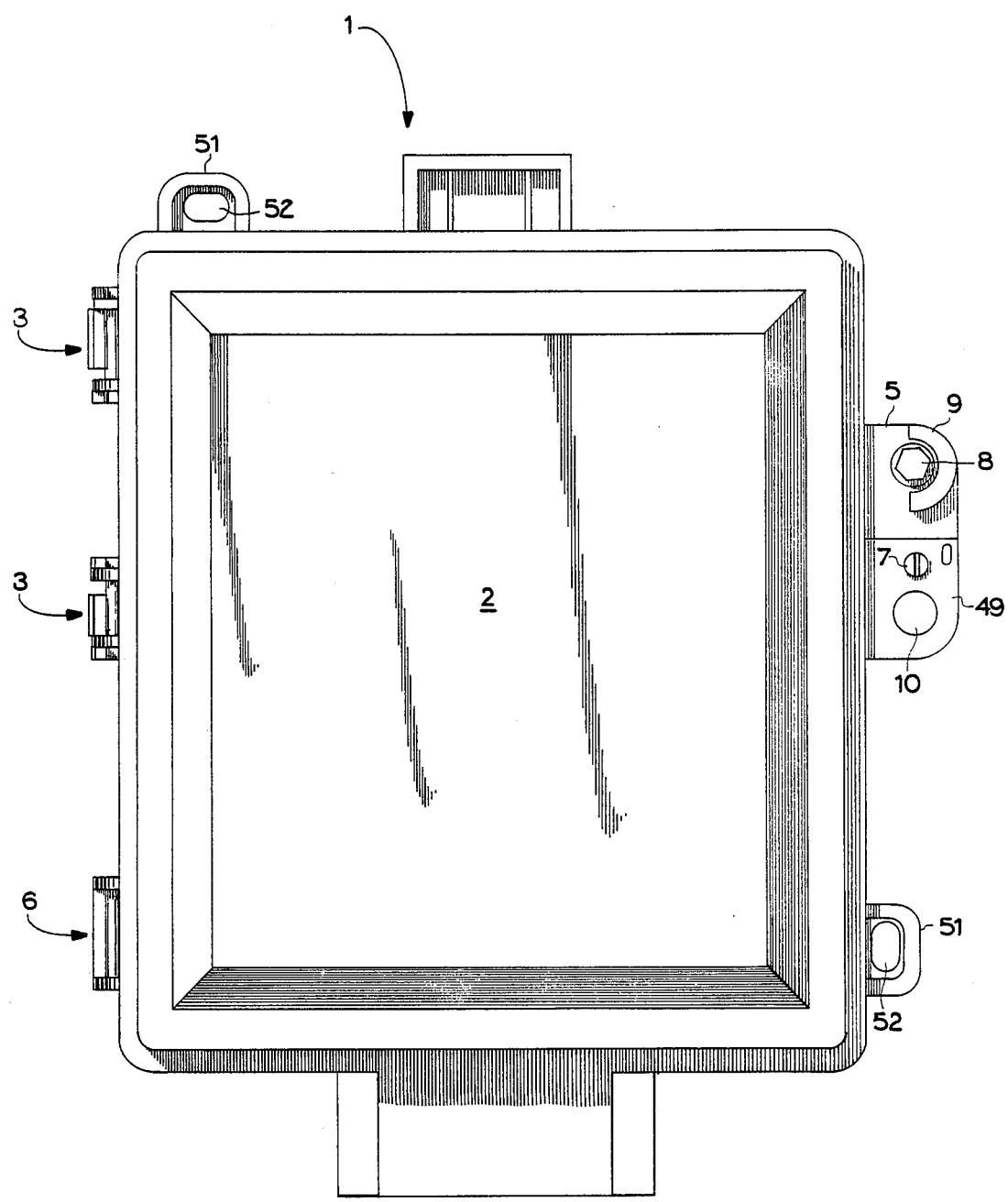
FIG. 1 is a plan view of the invention in its completely closed position.
Figure 2:
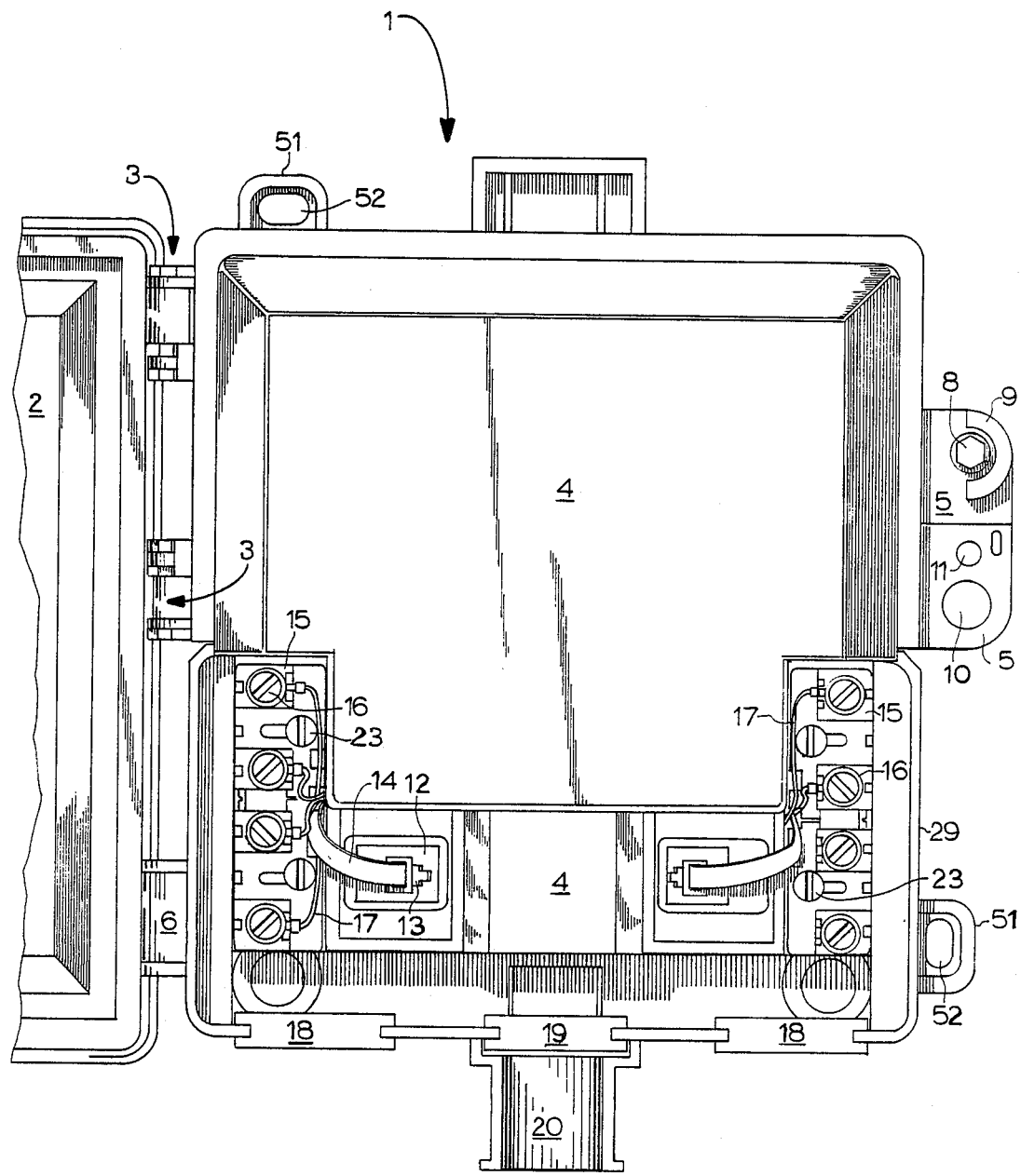
FIG. 2 is a plan view of the invention with its outer door open and the inner door closed, exposing a portion of the cavity of the box designed for customer access.

Shown in FIG. 1, by element 1 is a detailed description of a container for telephone network interface devices in its closed position, i.e., with both doors closed. In FIG. 2, element 1 is the same device with both doors open. As with most containers, the invention has the appearance of a box and is composed of a base made up of a backwall 28 and an upstanding sidewall 29 affixed to the backwall delimiting a cavity in which there is disposed a plurality of elements, more fully described later. The box has outer and inner doors 2 and 4 respectively. The inner door 4 covers only a portion of the cavity created by backwall 28 and sidewall 29, the secured portion of the cavity. Outer door 2 covers not only the inner door 4 and that portion of the cavity which door 4 covers but also all of the cavity created by backwall 28 and sidewall 29, as well as inner door 4. Doors 4 and 2 are hingeably (rotatively) attached to sidewall 29 by hinges 3 and 6. Hinge 6 is a conventional prior art known hinge and forms no part of the invention. However, hinge 3 is believed to be novel and forms a part of the invention. Both doors 4 and 2 are hingeably attached to sidewall 29 by hinge 3. Door 2 is not only hingeably and rotatively attached to sidewall 29 by hinge 3, but is also hingeably and rotatively attached to sidewall 29 by hinge 6. Hinge 6 could be deleted altogether, or, it could be replaced with a hinge like that of hinge 3 as a matter of choice.

Figure 3:
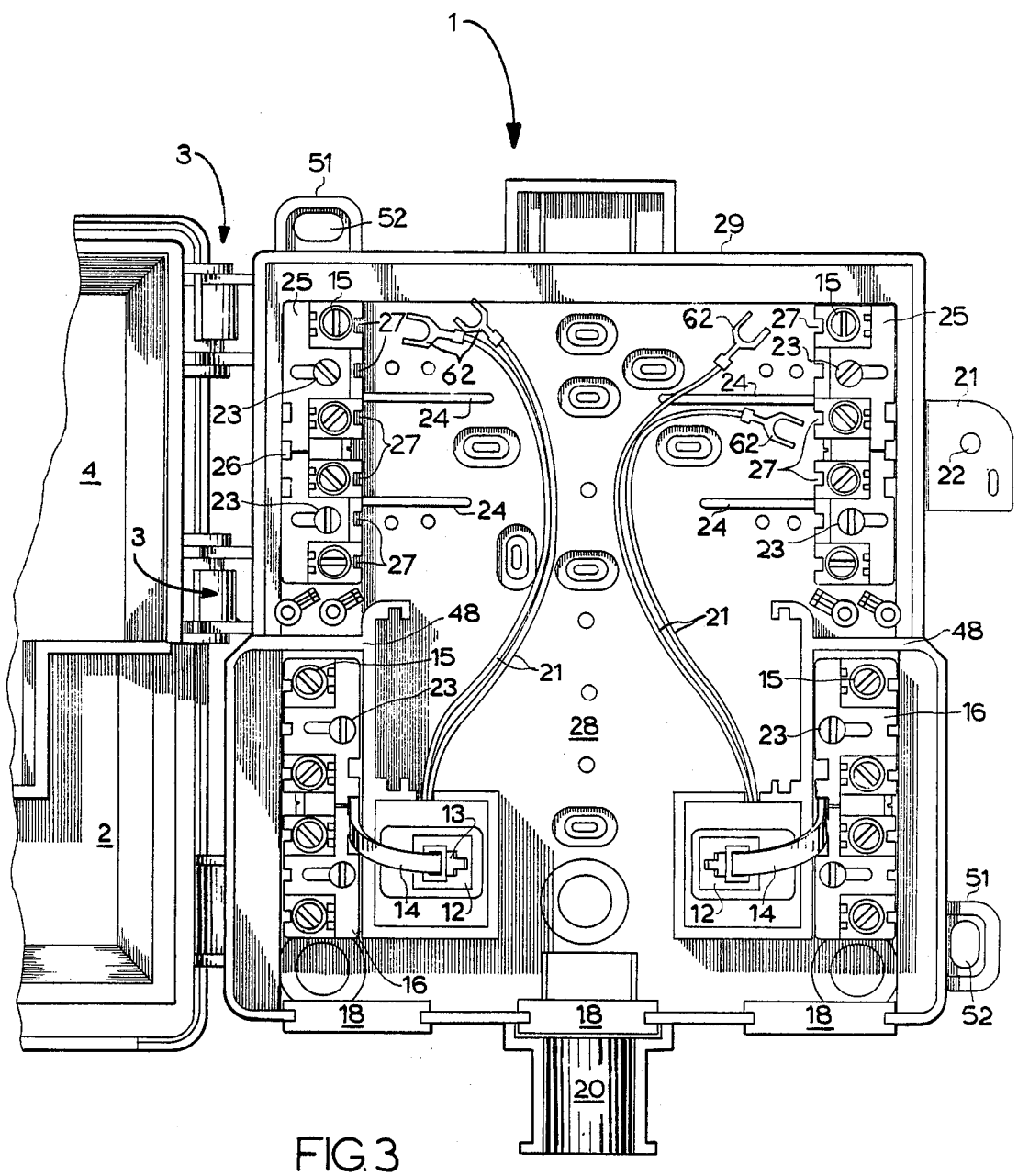
FIG. 3 is a plan view of the invention in its open position, namely both doors open, exposing all of the cavity of the box in which there is a first set of terminals adapted to be connected to a Telephone Company owned subscriber loop and a second set of terminals adapted to be connected to wiring of the subscriber premises and plug and jack and conductor means to connect and disconnect the first set of terminals with the second set of terminals.

Viewing the righthand portion of FIG. 3, there is shown a laterally extending side member 21 (first locking device) affixed to upstanding sidewall 29, in which there is a threaded aperture 22. Viewing FIG. 6, laterally extending from and affixed to the right-hand side of inner door 4 is tab member 5 (complementary locking device) which includes a threaded aperture 11, a locking aperture 10, and upstanding guard member 9, partially circumscribing a hexagonal bolt member 8 adapted to be secured in threaded aperture 22 of side member 21. Bolt member 8 is of such a size and shape that ordinary hand tools purchased at local hardware stores and elsewhere will not fit it and is partially circumscribed by upstanding guard member 9, which limits the amount of space between the outer periphery of bolt 8 and the interior surface of upstanding guard member 9. In order to disengage bolt member 8 from threaded aperture 22 and to fit in between bolt 8 and guard member 9, a special tool is needed, customarily in the hands of Telephone Company employees only and not generally available to the public, the purpose being to keep a non-Telephone Company employee from entering into (opening up) inner door 4.

From FIG. 6, it can be realized that affixed to door 2 is tab 49 (a second locking device) and that element 5 (complementary locking device) may be affixed to element 21 (first locking device) via bolt 8 and threaded aperture 22 and element 49 may be affixed to element 5 via bolt 7 and threaded aperture 11 of which extension 31 forms a part. Apertures 10 in elements 5 and 49 are aligned with one another and when doors 2 and 4 are in their closed position, a lock can be inserted in this aperture thereby locking doors 2 and 4 together.

In FIG. 2 there is shown a plan view of the disclosed invention with only one door open, door 2, and door 4 in its closed position. This configuration exposes only a portion of the cavity delimited by backwall 28 and upstanding sidewall 29. That portion of the cavity not exposed and covered by door 4 is deemed a secured portion of the cavity, the security arising out of inner door 4 being closed in combination with sidewall 29, backwall 28 and wall 48. In the non-secured cavity portion, that portion of the cavity exposed by opening of the outer door 2, with door 4 closed, there are disposed two sets of terminals formed of dielectric terminal blocks 15 and terminals metallic screw members 16, terminals 16 being secured in apertures (not shown) of dielectric block 15. As described in U.S. Pat. No. 4,488,008, terminals 16 are affixed to conductors 17 (FIG. 2), which are affixed to conductor 14 which is in turn connected to plug 13, which may be inserted into jack 12. Terminals of jack 13 (not shown) may be connected to conductors 21, which are adapted to be connected to a second set of terminals 15 by means of spades 62 shown in the upper portion of FIG. 3. Operation of the electrical portion of the instant invention is the same as that as shown in U.S. Pat. No. 4,488,008, which has already been incorporated herein in its entirety by reference. For further disclosure and description of how the plug and jack and first and second terminals operate in relation to one another and provide the network interface device service, reference is made to such patent and its disclosure plus the patents referred to therein. The two sets of terminals 15 of FIG. 2 on both the left and righthand side of the backwall 28 and in the non-secured portion of the cavity are identical one to another and they operate, in an electrical manner, as described in U.S. Pat. No. 4,488,008, in combination with a second set of like terminals located in the secured portion of the cavity. It is to be noted that wall 48 partially circumscribes and divides the first set of terminals 15 and their associated dielectric block 16 from the second set, thereby preventing entrance into the secured portion of the cavity which could otherwise be achieved by removing dielectric block 16 from backwall 28 by removing fasteners 23.

Turning to FIG. 3 and comparing the elements disclosed by this figure in comparison to FIG. 2, it will be noted that FIG. 3 shows the invention with doors 2 and 4 in their open position. Note door 4 nested inside of door 2. This open position of door 4 does two things: first, it exposes the secured portion of the cavity and second it positions the parts of hinge 3 so that door 2 may be removed from the upstanding sidewall 29 once door 4 is disengaged from hinge 3 and sidewall 29. It is only in this position that removal of door 4 and then door 2 can be accomplished as hereinafter more fully explained.

Turning briefly to FIGS. 1, 2, and 3, there is shown in the bottom right-hand portion on the outside of upstanding wall 29 protruding member 51 which has therein aperture 52. There is a like member 51 in the upper lefthand portion of the figure. Both of these members are used to affix the invention to a wall or some other base.

In the upper portion of the secured cavity there are a second set of terminals (two in number) composed of dielectric terminal blocks 25 each carrying or containing a plurality of metallic terminals 15. These terminals are adapted to be connected to that portion of the Telephone Company owned subscriber loop and because of such connection are deemed to be worthy of a high degree of security to keep premise owners from venturing into the telephone circuit and to other electronic means (not shown) disposed in this second cavity. The two sets of terminals in the lower half of the cavity are the terminals that are adapted to be connected to the premise wiring of an individual premise and are to be accessible to the premise owner so that he may remove plug 13 from jack 12 to perform the testing procedures as described in U.S. Pat. No. 4,488,008.

As disclosed in U.S. Pat. No. 4,488,008, it is usually desirable in a telephone network interface device to have an optional ringer sometimes referred to as a half ringer or a protector means connected to the circuit, referred to hereinafter collectively or individually as electronic features. As is often the case, the electronic features manifest themselves as electronic circuits on PC boards, with different manufacturers making them in different sizes and shapes. To accommodate PC boards of different sizes and shapes, dielectric blocks 25 in the secured cavity are moveable, that is to say that they can be moved along the backwall 28 towards the center of the backwall to a variable position by unloosening fastener 23 and sliding dielectric block 25 along ribs 24 to a predetermined position and then tightening fastener 23 to backwall 28. Further to this notion, reference is made to FIG. 4. Each dielectric block 25 is serrated (weakened) at a predetermined point 26 so that it may be broken into two halves 25 and 25' as shown in FIG. 4. Each block 25 and 25' has a plurality of upstanding slots 27 in a first surface and a plurality of slots 30 in a second surface, the second surface being adapted to be in abutting and sliding relationship with the uppermost surface of backwall 28. Note FIG. 5. Rib 24 is an upstanding member affixed to backwall 28 and is adapted to be slideably received in slot 30. Employing such an arrangement, dielectric blocks 25 and 25' can be moved relative to one another to accommodate a given length of a PC board and then fixed to backwall 28 by fastener 23. Terminal portions of PC boards are adapted to be fitted into slot 27 of dielectric blocks 25 and 25'.

Figure 7:
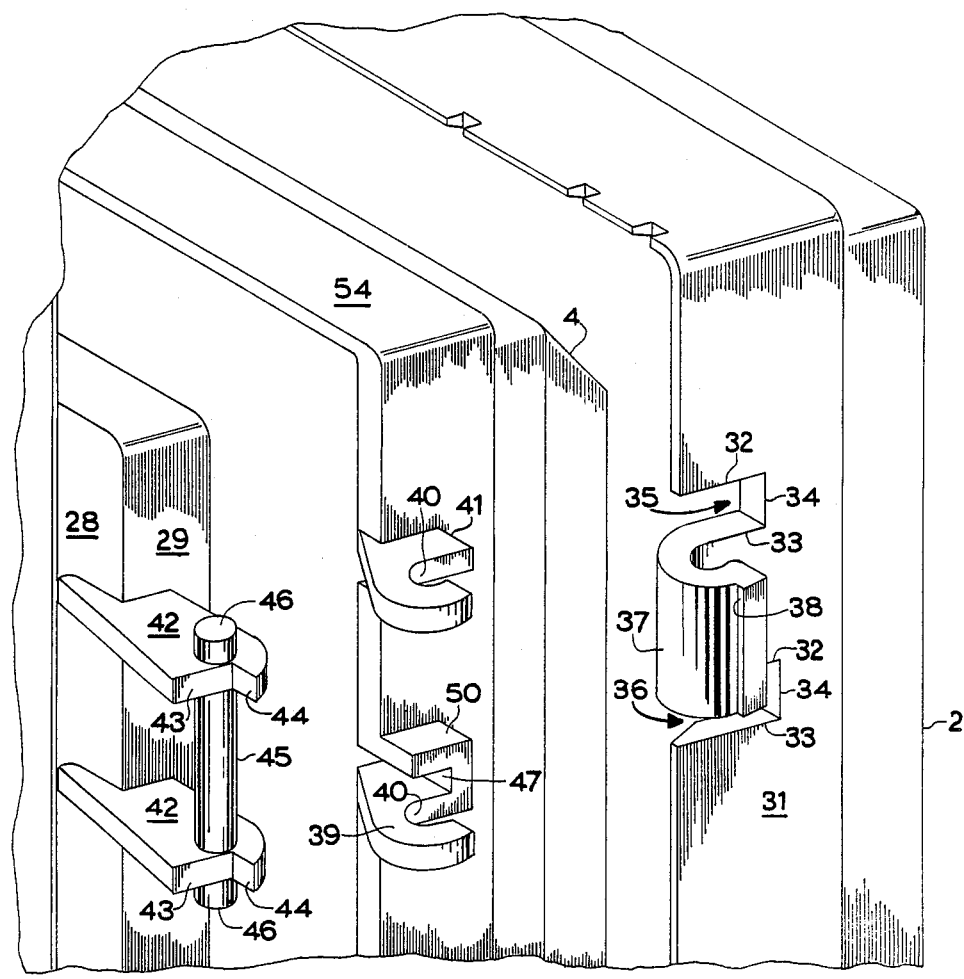
FIG. 7 is a partial cut-away exploded perspective view of the components comprising the novel hinge of the invention.

Attention is now directed to FIG. 7. Disclosed in this figure are the components of hinge 3 of the invention in its disassembled mode. In the extreme right-hand side of FIG. 3 is a cut away portion of door 2 composed of an upstanding sidewall 31 circumscribing a top or a base (unnumbered). Each hinge 3 has a plurality of spaced-apart slots 35 and 36 in the sidewall 31 of door 2 and such slots are delimited by sidewalls 32 and 33 and bottom wall 34. Disposed in between slots 35 and 36 is a "U" shaped member 37, one leg which is integral with sidewall 31 of door 2, and the other leg is free. On the terminal portion of the free leg of element 37 is a stop means 38, adapted to come into abutting relationship with door 4 in a manner that will be fully explained later.

Moving leftwardly, there is shown that portion of hinge 3 associated with door 4, which, like door 2 is formed from a backwall (unnumbered) circumscribed by an upstanding sidewall 54. Affixed to the sidewall 54 are a pair of receivers 39 and 41, adapted to be disposed in slots 35 and 36 of door 2. Each receiver 39 and 41 has an open recess 40 therein in which rod terminal portion 46 may be rotatively received. Receivers 39 and 41, when assembled, can be rotated around rod terminal portions 46. Also attached to sidewall 54 is protrusion 50 having slot 47 therein adapted to receive a protrusion 42 in a manner that will be hereinafter described. Receiver 39 and protrusion 50 are adapted to be received in slot 36, slot 36 being of such a size (usually larger than 35) to accommodate same. Receiver 41 is adapted to be received in slot 35. One of the protrusions 42 is adapted to be received in slot 47; consequently, when the elements just described are assembled, essentially all of the space delimited by the sidewalls 32, 33, and bottom wall 34 of slot 36 is occupied when doors 2 and 4 are in a predetermined position, i.e., both closed or both open.

Shown in the extreme lefthand portion of FIG. 7 is backwall 28 and sidewall 29. Affixed to backwall 28 and sidewall 29, are a pair of laterally extending protrusions 42. Each member of this pair are spaced apart from one another and each member has two intersecting sidewalls 43 and 44 delimiting a notch therebetween. Affixed to protrusions 42 is a rod having two terminal portions 46 and a rod median portion 45. Rod median portion 45 is disposed between and the rod terminal portions 46 disposed outside of the pair of protrusions 42. As previously disclosed, rod terminal portions 46 are designed to be rotatively received in recess 40 of receivers 39 and 41. In turn, rod median portion 45 is adapted to be rotatively received in that portion of the "U" shaped member between its two legs, such a combination resulting in a hinge that will not permit the removal of either door 2 or 4 from rod median portion 45 and rod terminal portion 46 respectively without rotating doors 2 and 4 to a predetermined position, that position being an essentially open position.

Figure 8:
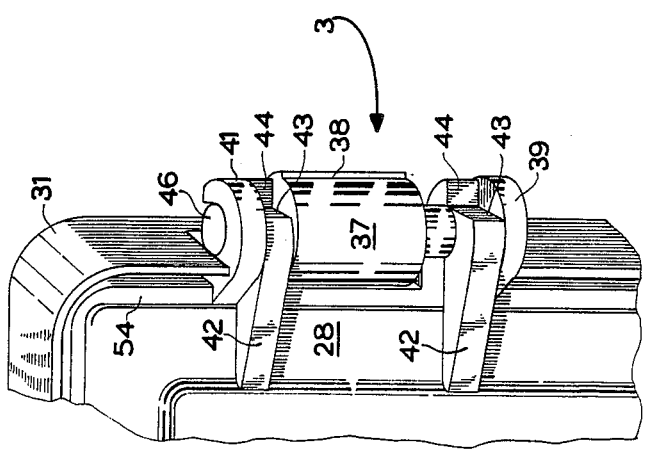
FIG. 8 is a partial perspective view of the hinge components of FIG. 7 in their assembled configuration with all doors in their closed position.
Figure 11:
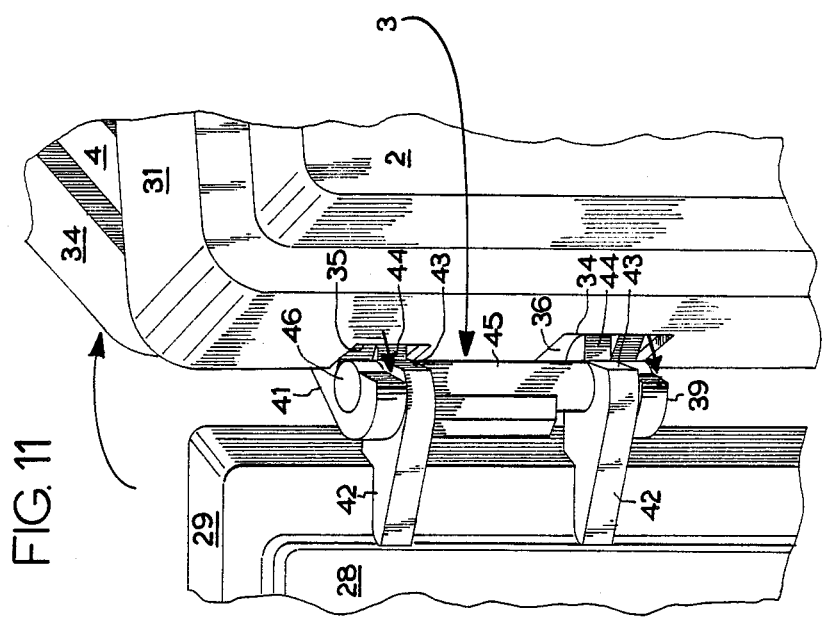
FIG. 11 is a partial perspective view of the hinge of FIG. 9 with the inner door rotatable 90° towards its fully opened position.
Figure 10:
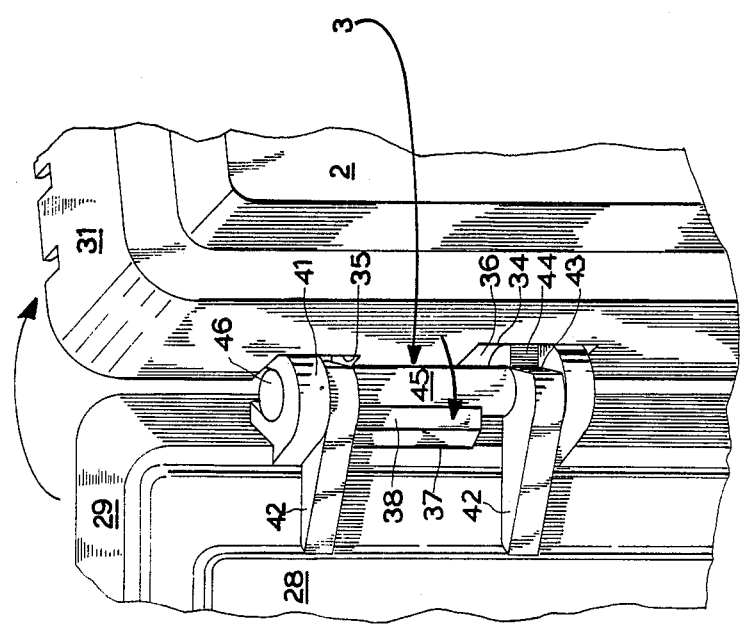
FIG. 10 is a partial perspective view of the hinge of FIG. 9 showing the outer door nearly rotated 180° to its fully open position.
Figure 15:
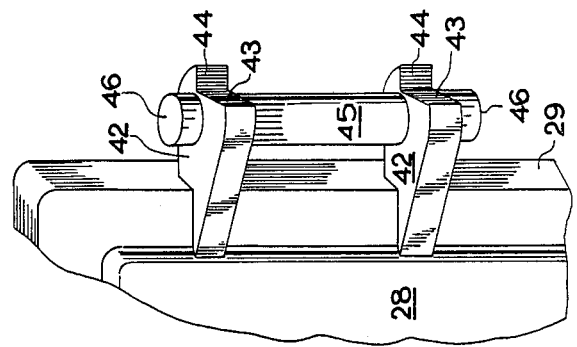
FIG. 15 is a partial perspective view of a part of the hinge of FIG. 9.

In FIG. 8, there is shown hinge 3 in its assembled configuration, i.e., the individual elements shown in FIG. 7 are assembled together as a hinge. Receiving elements 39 and 41 are disposed about rod terminal portions 46, the rod terminal portions fitting in the recesses 40. Rod median portion 45 is rotatively received in between the opposing sidewalls of the "U" shaped member 37.

Figure 9:
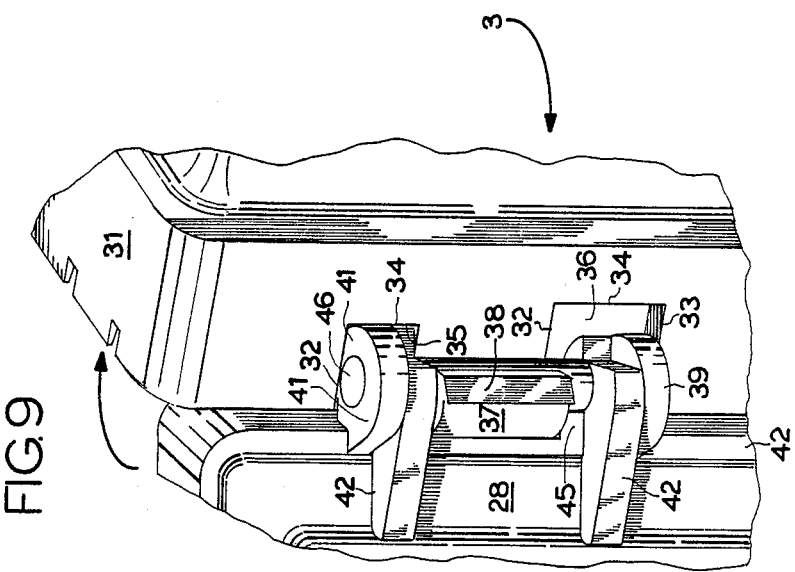
FIG. 9 is a partial perspective view of the hinge of FIG. 8 with the outer door rotated 90° towards its fully open (180°) position.

In FIG. 9, there is shown a partial perspective view of the assembled hinge 3 with door 2 rotated approximately 90° towards its fully open 180° position. When door 2 is rotated to its fully open position and door 4 is still in its closed position, protrusion 38 abuts against a free surface of door 4 and acts as a stop, limiting the rotation of door 2 to a 180° rotation (its open position). In such position, protrusion 38 abuts against sidewall 54 of door 4.

Figure 14:
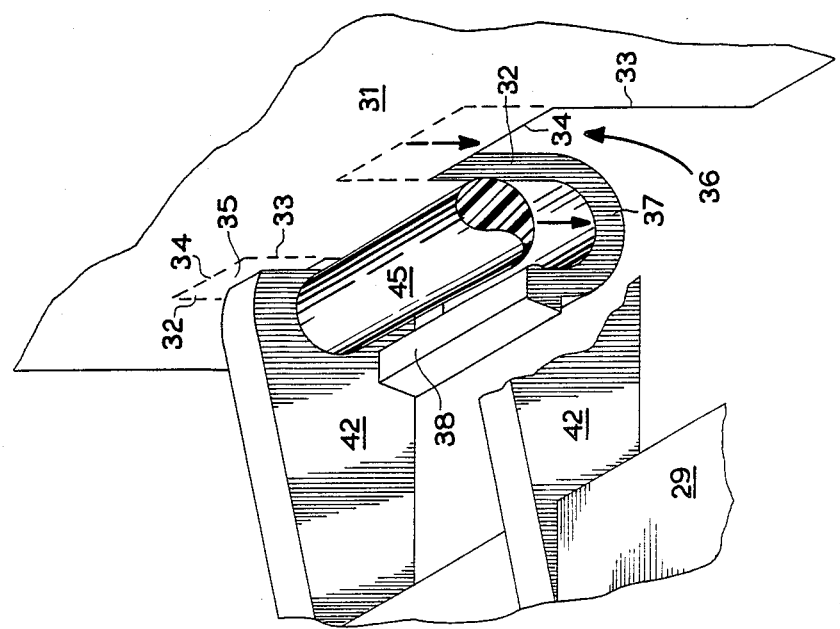
FIG. 14 is a partial perspective view of the hinge of FIG. 13 showing the outer door being disengaged.

Receivers 39 and 41 are disposed in slots 36 and 35, of element 31 respectively. Such receivers in all positions of door 4, other than the open position (when the second and first doors are in their open position and are in a nested relationship as partially shown in the lefthand portion of FIG. 3) are disposed between the bottom wall 34 of slots 35 and 36 and sidewalls 44 of protrusions 42, thus prohibiting movement of element 31 away from and thus disengagement from rod median or terminal portions. It is only by first removing door 4 from rod terminal portion 46, that element 31 of door 2 can be moved to a position so as to disengage rod median portion 45 from the "U" shaped member 37. By viewing FIGS. 8, 9, 10, 11, and 12, in that order, one can realize that by opening door 2 to its open position and then by opening door 4 to its open position (note the nested relationship shown in the lefthand portion of FIG. 3), rod terminal portions 46 are cleared so as to permit removal of element 31 by disengaging receivers 39 and 41 from rod terminal portions 46. Note specifically the configuration of these elements in FIG. 12. When door 4 is removed (disengaged from its hinge 3), slots 35 and 36 are then aligned with those notches formed in the terminal portions of protrusions 42 delimited by sidewalls 43 and 44. When such an alignment takes place and the receivers 39 and 41 are removed, that configuration of the elements of hinge 3 as shown in FIG. 13 is achieved. Once this is the case, then rod median portion 45 can be disengaged from "U" shaped member 37 as shown in FIG. 14, merely by pushing the rod median portion 45 towards the open portion of the "U" shaped member 37. Note the phantom (dotted) lines of slots 35 and 36 in FIGS. 12 and 14.

When both doors 2 and 4 are essentially fully open or fully closed, element 50 in combination with element 42 essentially fill the space denoted as slot 36. In like manner, receiver 41 protrusion 42 essentially fill that space denoted as slot 35 in the same position. Between the aforementioned positions, such is not the case. See for examples FIGS. 10 and 11.

Apart from the metal parts (conductors 21, spades 62, terminals 15 and the like) container 1 may be injection molded from a suitable thermoplastic material, sold by General Electric Corporation under the Trademark Lexan.

A container or a box with a set of double (inner and outer) doors and a unique hinge has just been described, the inner door adapted to be nested within the confines of the outer door in the fully closed and fully opened position. The hinge is of such a construction that the outer door cannot be removed without first removing the inner door and the inner door cannot be removed until it has been rotated to its fully opened position. Once the inner door has been removed from the hinge, a combination results whereby the outer door may be removed from its engagement with the sidewall of the box, making it quite obvious that if a premise owner were to complain to a Telephone Company that either one or both of the doors were removed (and such were not removed by Telephone Company employees) such would be irrefutable proof that the premise owner and had invaded the secured portion of the cavity thereby pinpointing the financial blame for any necessary repairs. It is only by alignment of the notches delimited by sidewalls 43 and 44 in protrusions 42 with slots 35 and 36 and removal of receiver means 39 and 41 from the rod terminal portions 46 and slots 35 and 36 to achieve a configuration as that shown in FIG. 14 that the outer door 2 can be removed from sidewall 29.

Element 20 is the sidewall of an aperture in sidewall 29 which can be temporialy blocked by removal disk 19. Element 18 is another removable disk that blocks another aperture (unnumbered) in sidewall 29, both apertures being useful for ingress and egress into the cavity delimited by upstanding sidewall 29.

What is claimed is:

1. A telephone network interface device adapted to be connected to and in between a telephone subscriber premise wiring and a Telephone Company owned subscriber loop, providing limited access by a telephone subscriber and complete access by Telephone Company employees comprising an open top base composed of a backwall and an upstanding sidewall essentially circumscribing said backwall and delimiting a cavity, containing:

(a) first and second set of terminals, said first set of terminals adapted to be connected to the Telephone Company owned subscriber loop and said second set of terminals adapted to be connected to the telephone subscriber premise wiring, said first set of terminals containing first and second spaced apart dielectric blocks, each of said first and second dielectric blocks containing at least one first slot in a first surface thereof, each said first slot in said first dielectric block being in alignment with said first slot in the second dielectric block and disposed essentially prependicular to the backwall, at least one of said first and second dielectric blocks also containing a second slot in a second surface thereof and said backwall includes an upstanding rib slideably engaged in the said second slot of at least one of said first and second dielectric blocks so that at least one of the first and second dielectric blocks may be slideably moved along said upstanding rib;

(b) a jack and a plug both having electrical contacts therein and both adapted to be mechanically and electrically engaged and disengaged with one another; and, (c) a first conductor connected to the plug and to the second set of terminals for connecting the plug to said second set of terminals and a second conductor connected to the jack for electrically connecting said jack to said first set of terminals.

2. The network interface device of claim 1 wherein either said first or said second dielectric block is composed of at least two separate dielectric blocks, each of said two separate dielectric blocks containing at least one of said first and one of said second slots therein and a fastener.

3. The network interface device of claim 1 further including a fastener for at least one of said first and at least one of said second dielectric blocks adapted to secure at least one of said first and second dielectric blocks to the backwall.

4. The network interface device of claim 1 further including an inner door rotatively affixed to said sidewall adapted to be positioned in an open and closed position and in its closed position covering only said first set of terminals; and, an outer door rotatively affixed to said sidewall adapted to be positioned in an open and closed position so that in its closed position it covers said inner door, said second set of terminals, said jack and said plug.

5. The network interface device of claim 4 wherein said inner door contains a complementary locking device and said upstanding sidewall contains a first locking device, both adapted to be placed in locking engagement with one another.

6. The network interface device of claim 5 wherein said outer door contains a second locking device adapted to be placed in locking engagement with said complementary locking device.

7. A telephone network interface device adapted to be connected to and in between a telephone subscriber premise wiring and a Telephone Company owned subscriber loop comprising a base, first and second sets of terminals connected to the base and a device to place said first set of terminals in electrical communication with said second set of terminals, said first set of terminals including first and second spaced apart dielectric blocks, each dielectric block containing at least one first slot in a first surface thereof, said first slot in the first dielectric block being in alignment with a first slot in said second dielectric block and disposed essentially perpendicular to the base, at least one of said first and second dielectric blocks also containing at least one second slot in a second surface thereof disposed essentially perpendicular to said first slot, said base containing at least one upstanding rib, said upstanding rib slideably engaged in said second slot so that at least one of said first and second dielectric blocks may be slideably moved along said upstanding rib while engaged therewith.

8. The network interface device of claim 7 further including a fastener for at least one of said first and second dielectric blocks adapted to secure at least one of said first and second dielectric blocks to said base.

9. The network interface device of claim 8 wherein either said first or said second dielectric block is composed of at least two separate dielectric blocks, each of said two separate dielectric blocks containing at least one of said first and second slots and a fastener.

10. A box comprising:

(a) a base composed of a black wall and an upstanding sidewall affixed to the back wall, the back wall and upstanding sidewall delimiting a cavity;

(b) an inner removable door rotatively engaged with said upstanding sidewall adapted to be rotated between a closed and an open position;

(c) an outer removable door rotatively engaged with the upstanding sidewall adapted to be rotated between a closed and an open position;

(d) a hinge, rotatively engaging said inner and outer doors to said upstanding sidewall permitting disengagement of said outer door from the upstanding sidewall when said inner door has been placed in a predetermined position, wherein said hinge comprises:

(i) a pair of protrusions affixed to and laterally extending from the upstanding sidewall, each member of said pair of protrusions spaced apart from one another and having two sidewalls forming a notch therein;

(ii) a rod, having two terminal and one median portions, affixed to each protrusion, said rod median portion disposed between the protrusions and said rod terminal portions disposed outside of said pair of protrusions;

(iii) a pair of slots in the outer door, each slot of said pair spaced apart from the other and each slot having a bottom wall and sidewalls delimiting a slot space; and, (iv) a pair of receivers affixed to said inner door and disposed in said slot space in said outer door, each receiver having an open recess therein in which a rod terminal portion is received so that each receiver may be at least partially rotated about a rod terminal portion and each receiver is adapted to be rotated from an inner door closed position, where in said closed position a portion of said receivers are disposed between the rod terminal portions and the bottom walls of said pair of slots thereby prohibiting movement of said outer door into said notches of the protrusion and removal of the outer door from said rod terminal portions, to an inner door open position where in said open position said receivers are not disposed between said rod terminal portions and said bottom walls of said pair of slots thereby permitting removal of the inner door from said rod terminal portions.

11. The box of claim 10 further including a "U" shaped member disposed between said pair of slots, one leg of said "U" shaped member is affixed to the outer door and the other leg is free, the free leg containing a protruding stop member thereon adapted to be in abutting contact with said inner door when said inner door is in its closed position and said outer door is in its open position.

12. The box described in claim 10 wherein said inner door has additional protrusions affixed thereon, said additional protrusions being of a size and so disposed to be in alignment with said slot space of the outer door so that said additional protrusions essentially occupy any space in said slot space of the outer door not otherwise occupied by said receivers of the inner door when said inner and outer doors are simultaneously either in closed or open positions.

13. The box of claim 12 wherein said additional protrusions contain a slot therein in which one member of said first mentioned pair of protrusions is rotatably disposed and adapted to be in abutting contact with one of said sidewalls of said notch thereby prohibiting further rotation of said first door.

14. The box of claim 12 wherein the cavity includes:
(a) a first and second set of terminals, the first set of terminals adapted to be connected to a Telephone Company-owned subscriber loop and the second set of terminals being adapted to be connected to a telephone subscriber premise wiring wherein said first set of terminals are composed of first and second spaced apart dielectric blocks, each of said first and second dielectric blocks containing at least one terminal and at least one first slot in one surface thereof, said first slot in the first dielectric block being in alignment with a first slot in said second dielectric block;
(b) a jack and a plug both having electrical contacts therein and both adapted to be mechanically and electrically engaged and disengaged with one another; and,
(c) a first conductor connected to the plug and to the second set of terminals for connecting the plug to said second set of terminals and a second conductor connected to the jack for electrically connecting said jack to said first set of terminals.

15. The box of claim 14 wherein at least one of said first and second dielectric blocks contain a second slot in another surface thereof, the backwall contains an upstanding rib slideably engaged in said second slot so that said dielectric block containing said second slot may be slideably moved along said rib.

16. The box of claim 14 further including a fastener for at least one of said first and second dielectric blocks adapted to secure at least one of said first and second dielectric blocks to said backwall.

17. The box of claim 14 wherein said inner door contains a complementary locking device and said upstanding sidewall of said base contains a first locking device, both first and complementary locking devices adapted to be placed in locking engagement with one another.

18. The box of claim 17 wherein said outer door contains a second locking device adapted to be placed in locking engagement with said complementary locking device.

19. The box of claim 10 wherein said outer removable door in its closed position covers said cavity and said inner door.

20. The box of claim 10 wherein said inner door in its closed position covers a part of said cavity.

* * * * *

UNITED STATES PATENT OFFICE
CERTIFICATE OF CORRECTION

Patent No. 4,741,032            Dated  April 26, 1988

Inventor(s)   Clifton G. Hampton

It is certified that error appears in the above-identified patent and that said Letters Patent are hereby corrected as shown below:

In Column 10, Line 26, "black" should read -- back --

Signed and Sealed this

Twentieth Day of September, 1988

*Attest:*

DONALD J. QUIGG

*Attesting Officer*     *Commissioner of Patents and Trademarks*